(12) United States Patent
Engelhardt

(10) Patent No.: US 10,416,431 B2
(45) Date of Patent: Sep. 17, 2019

(54) METHOD OF AND MICROSCOPE WITH INSTALLATION FOR FOCUS STABILIZATION

(71) Applicant: Deutsches Krebsforschungszentrum, Heidelberg (DE)

(72) Inventor: Johann Engelhardt, Bad Schoenborn (DE)

(73) Assignee: DEUTSCHES KREBSFORSCHUNGSZENTRUM, Heidelberg (DE)

( * ) Notice: Subject to any disclaimer, the term of this patent is extended or adjusted under 35 U.S.C. 154(b) by 0 days.

(21) Appl. No.: 16/272,035

(22) Filed: Feb. 11, 2019

(65) Prior Publication Data

US 2019/0170992 A1 Jun. 6, 2019

Related U.S. Application Data

(63) Continuation of application No. PCT/EP2017/070738, filed on Aug. 16, 2017.

(30) Foreign Application Priority Data

Aug. 25, 2016 (EP) .................................. 16 185 629

(51) Int. Cl.
*G02B 21/24* (2006.01)
*G01B 11/14* (2006.01)
(Continued)

(52) U.S. Cl.
CPC .......... *G02B 21/245* (2013.01); *G01B 11/002* (2013.01); *G01B 11/14* (2013.01); *G02B 7/28* (2013.01)

(58) Field of Classification Search
CPC .......... G01B 11/02; G01B 11/14; G01B 11/22; G02B 7/28; G02B 7/285; G02B 21/241;
(Continued)

(56) References Cited

U.S. PATENT DOCUMENTS 3,633,991 A * 1/1972 Miller .................. G02B 21/241
359/389
4,433,235 A * 2/1984 Akiyama ............. G02B 21/245
250/201.4
(Continued)

FOREIGN PATENT DOCUMENTS

DE 10 2011 003807 A1 8/2012
WO 2004/029691 A1 4/2004

OTHER PUBLICATIONS

PCT Search Search Report in co-pending, related PCT Application PCT/EP2017/070738, dated Oct. 27, 2017.

*Primary Examiner* — Gordon J Stock, Jr.
(74) *Attorney, Agent, or Firm* — Thomas | Horstemeyer, LLP

(57) ABSTRACT

In a method of monitoring a relative position of a microscope objective with regard to a sample a test beam of light is directed onto at least one at least partially reflective surface connected to the sample, and light of the test beam reflected at the at least one at least partially reflective surface is registered and evaluated. Additionally, the test beam is directed onto a reflective surface of the microscope objective facing the sample, and light of the test beam reflected at the reflective surface of the microscope objective is also registered and evaluated.

16 Claims, 3 Drawing Sheets

(51) Int. Cl.
*G02B 7/28* (2006.01)
*G01B 11/00* (2006.01)

(58) Field of Classification Search
CPC .. G02B 21/242; G02B 21/244; G02B 21/245; G02B 21/247; G02B 21/006
See application file for complete search history.

(56) References Cited

U.S. PATENT DOCUMENTS

| | | | |
|---|---|---|---|
| 4,931,630 A | 6/1990 | Cohen et al. | |
| 4,958,920 A * | 9/1990 | Jorgens | G02B 21/245 |
| | | | 250/201.3 |
| 5,245,173 A * | 9/1993 | Yamana | G02B 21/241 |
| | | | 250/201.3 |
| 5,338,924 A * | 8/1994 | Barrett | G02B 7/28 |
| | | | 250/201.4 |
| 5,877,892 A * | 3/1999 | Nakamura | G01C 15/00 |
| | | | 356/624 |
| 6,130,745 A * | 10/2000 | Manian | G01N 21/6452 |
| | | | 356/123 |
| 6,897,421 B2 * | 5/2005 | Gelman | G02B 7/38 |
| | | | 250/201.2 |
| 7,075,046 B2 * | 7/2006 | Kennedy | G02B 21/245 |
| | | | 250/201.2 |
| 7,202,953 B1 * | 4/2007 | Mueller | G01J 3/02 |
| | | | 250/201.2 |
| 7,205,518 B2 * | 4/2007 | Neuvonen | G02B 21/241 |
| | | | 250/201.2 |
| 7,903,259 B2 * | 3/2011 | Heiden | G01B 11/002 |
| | | | 356/500 |
| 8,143,562 B2 * | 3/2012 | Kawanabe | H04N 5/23212 |
| | | | 250/201.2 |
| 8,174,686 B2 * | 5/2012 | Namba | G01N 21/6458 |
| | | | 250/201.2 |
| 8,362,409 B2 * | 1/2013 | Cooper | G02B 21/245 |
| | | | 250/201.4 |
| 8,498,048 B2 * | 7/2013 | Wilson | G02B 21/006 |
| | | | 359/383 |
| 8,582,113 B2 * | 11/2013 | Heiden | G01B 11/002 |
| | | | 356/500 |
| 8,629,382 B2 * | 1/2014 | Sase | G02B 21/245 |
| | | | 250/201.2 |
| 9,297,980 B2 * | 3/2016 | Kimura | G01N 21/65 |
| 9,671,601 B2 | 6/2017 | Krueger et al. | |
| 9,921,399 B2 * | 3/2018 | Cooper | G02B 21/02 |
| 2006/0001954 A1 * | 1/2006 | Wahl | G02B 21/086 |
| | | | 359/368 |
| 2015/0253127 A1 | 9/2015 | Hughes et al. | |
| 2018/0191948 A1 * | 7/2018 | Zheng | G02B 7/365 |
| 2018/0262670 A1 * | 9/2018 | Condello | G02B 21/06 |
| 2018/0341083 A1 * | 11/2018 | Matsubara | G02B 7/28 |

\* cited by examiner

METHOD OF AND MICROSCOPE WITH INSTALLATION FOR FOCUS STABILIZATION

CROSS REFERENCE

The present application is a continuation to international patent application PCT/EP2017/070738 filed on Aug. 16, 2017, entitled "Method of and Microscope with Installation for Focus Stabilization" and claiming priority to European patent application EP 16 185 629.9 filed on Aug. 25, 2016 and also entitled "Method of and Microscope with Installation for Focus Stabilization".

FIELD

The present invention relates to method of monitoring a relative position of a microscope objective with regard to a sample. Further, the present invention relates to a microscope comprising a microscope objective and a microscope slide configured to hold a sample.

PRIOR ART

The relative position of a microscope objective with regard to a sample is essential in imaging the sample using the microscope objective. If, for example, this relative position varies unnoticed, the plane of the sample imaged using the microscope objective will also vary unnoticed. As a consequence, a series of images which are intended show the same sample location at consecutive points in time, for example, in fact show the sample at different focal planes or laterally shifted. Further, with any laser scanning microscopy requiring a longer period of time for even imaging one plane of the sample once, a distorted image of the sample will be generated, if the relative position of the microscope objective with regard to the sample varies. For reasons of simplicity, the following description will often only refer to deviations of the axial focus position because the axial focus position typically displays the prominent instability. Nevertheless, the problem and solution of the preset invention apply to all three spatial dimensions.

With increasing spatial resolution achieved by ultra-high resolution microscopy techniques like STED, for example, the requirements to be fulfilled in keeping a fixed relative position of the microscope objective with regard to the sample increases further. The increased spatial resolution requires an equally increased stability of the relative position of the microscope objective with regard to the sample.

In known methods of monitoring a relative position of a microscope objective with regard to a sample, a test beam of light which is laterally offset with regard to an optical axis of the microscope objective is directed through the microscope objective onto an at least partially reflective surface connected to the sample, and light of the test beam reflected at the at least partially reflective surface is registered and evaluated. The result of the evaluation is the actual focal distance of the microscope objective to the at least partially reflective surface connected to the sample, which may, for example, be the top surface of a microscope slide or a cover slip made of glass. Any variation of the focal distance of the microscope objective to the at least partially reflective surface connected to the sample may then be compensated to hold the sample at a desired focal distance to the microscope objective.

Directing the test beam through the microscope objective onto the at least partially reflective surface may be complicated. This particularly applies to an STED-microscope in which excitation light and STED-light are directed through the microscope objective into the sample and in which fluorescence light is directed by the microscope objective onto a detector. Additionally, the light of the test beam may disturb the operation of the STED-microscope, so that the test beam may only be applied in interruptions of the primary operation of the STED-microscope. Such a disturbance may be reduced by selecting a completely different wave length for the test beam than the wave lengths of the excitation light and the STED-light. A microscope objective of an STED-microscope, however, will regularly be adapted to the wave lengths of the excitation light and the STED-light, and this adaptation may not comply with necessary spectral properties of beam splitters used for coupling the test beam of a completely different wavelength into the beam path of the excitation light and the STED-light.

U.S. Pat. No. 4,931,630 A discloses an apparatus and a method for automatically focusing an interference microscope by directly sensing an interference pattern produced by a white light source with an auxiliary point detector. A beamsplitter intercepts part of the interference beam and directs it to the point detector. A narrow band filter filters light passing through the beam splitter on its way to a main detector array. A memory lock position of the microscope objective is manually selected and stored. Initially, the objective moves rapidly from the memory lock position until the presence of fringes is detected by the point detector. Momentum of the microscope causes the objective to overshoot beyond a fringe window. The microscope objective then is moved more slowly through the interference window until fringes are detected again; the lower speed resulting in a substantially reduced overshoot. Intensity measurements from the point detector are sensed and stored as the objective moves through the width of the fringe window. The microscope objective then is yet more slowly moved through the fringe window while sensing the intensities produced by the point detector until the objective reaches a point at which the intensity is equal to a preselected percentage of the maximum stored intensity.

There still is a need of a method and a microscope in which monitoring and optionally also correcting of a relative position of a microscope objective with regard to a sample is easily realized and does not disturb the primary use of the microscope objective.

SUMMARY OF THE INVENTION

The present invention provides a method of monitoring a relative position of a microscope objective with regard to a sample. The method comprises directing a test beam of light onto at least one at least one partially reflective surface connected to the sample, and registering and evaluating first reflected light of the test beam that is reflected at the at least one at least one partially reflective surface. The method further comprises also directing the test beam onto a reflective surface of the microscope objective facing the sample, and registering and evaluating second reflected light of the test beam that is reflected at the reflective surface of the microscope objective. The test beam is directed from a side of the sample facing away from the microscope objective through the at least one partially reflective surface connected to the sample onto the reflective surface of the microscope objective, and the first reflected light and the second reflected light are both registered at that side of the sample facing away from the microscope objective.

Further, the present invention provides a microscope. The microscope comprises a microscope objective, a microscope slide configured to hold a sample, and an installation for monitoring a relative position of the microscope objective with regard to the sample. The installation comprises a light source configured to direct a test beam of light onto at least one at least one partially reflective surface connected to the microscope slide, and a detector configured to register first reflected light of the test beam that is reflected at the at least one surface. The light source is configured to also direct the test beam onto a reflective surface of the microscope objective facing the sample, and the detector is configured to also register second reflected light of the test beam reflected at the reflective surface of the microscope objective. The light source and the detector are both arranged at a side of the microscope slide facing away from the microscope objective, and the light source is configured to direct the test beam through the at least one partially reflective surface connected to the microscope slide onto the reflective surface of the microscope objective.

Other features and advantages of the present invention will become apparent to one with skill in the art upon examination of the following drawings and the detailed description. It is intended that all such additional features and advantages be included herein within the scope of the present invention, as defined by the claims.

SHORT DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
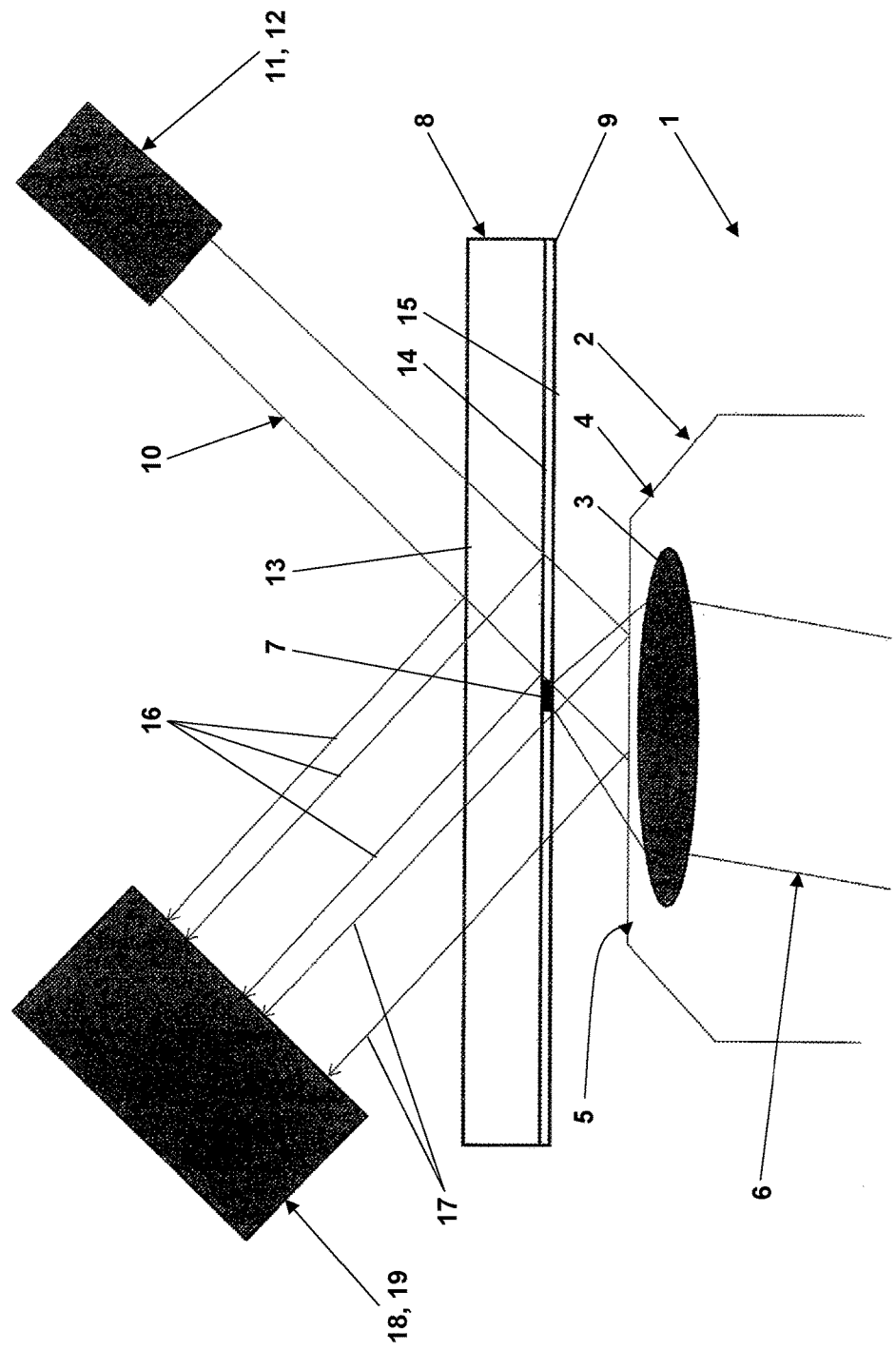
FIG. 1 shows parts of a microscope according to the present invention which are relevant for the present invention.

In a method of monitoring a relative position of a microscope objective with regard to a sample according to the present invention, a test beam of light is directed onto at least one partially reflective surface connected to the sample, and light of the test beam reflected at the at least one partially reflective surface is registered and evaluated. Additionally, the test beam is directed onto a reflective surface of the microscope objective facing the sample, and light of the test beam reflected at the reflective surface of the microscope objective is also registered and evaluated.

In this description, the indication that a surface is reflective or at least partially reflective means that any light emerges from the respective surfaces as a result of the test beam of light being directed onto the respective surface. There may be reflection, diffuse scattering, fluorescence or any other conversion of the light of the test beam at the respective surface. Particularly, the indication that a surface is reflective or at least partially reflective does not mean that the respective surface has to be mirror-reflective. Nevertheless, the respective surface, so far as being reflective, may be mirror-reflective.

According to the present invention, the reference in monitoring the relative position of the microscope objective with regard to the sample is not the entire optical system of the microscope objective but a reflective surface of the microscope objective. This reflective surface may be an outer surface of the microscope objective, or it may be a surface in the microscope objective. For example, the reflective surface may be a metal coated part of the surface of a glass body of a front lens of the microscope objective. In another embodiment, it may be a surface of a frame holding the front lens or of any other part of the microscope objective arranged in a fixed spatial relation to the front lens. The surface may be coated, structured or prepared to give a certain light response when the test beam of light is directed onto it.

The test beam is directed or oriented such that it is both reflected at the at least one partially reflective surface connected to the sample, and by the reflective surface of the microscope objective. Both the light reflected at the partially reflective surface and the light reflected at the reflective surface are registered. With any variation of the relative position of the microscope objective with regard to the sample, the relative positions at which the light is registered will vary. This particularly applies as long as the test beam is directed onto the partially reflective surface and the reflective surface out of a fixed direction. Optionally, multiple test beams may be used to enable detection of relative movements of the sample with respect to the microscope objective in different dimensions separately.

In the method according to the present invention, the test beam, coming from that side of the sample facing away from the microscope objective, is directed through the at least one partially reflective surface onto the reflective surface of the microscope objective. Thus, the arrangement of a light source for providing the test beam does not require any space in between the sample and the microscope objective or laterally besides the microscope objective or the sample. At that side of the sample facing away from the microscope objective, there will generally be sufficient free space for arranging the light source for the test beam.

The light of the test beam reflected at both the partially reflective surface connected to the sample and the reflective surface of the microscope objective is registered with a detector also located at that side of the sample facing away from the microscope objective. Thus, the detector is also arranged in an area, where space is not as limited as between the sample and the microscope objective. The detector may be a spatially resolving detector. Particularly, the detector may include a camera. A single digital camera registering both the light reflected at the partially reflective surface and the light reflected at the reflective surface ensures an easy evaluation for any variations of the relative positions at which the light is registered.

If the test beam is a beam of coherent light, like for example a beam of laser light, the light of the test beam reflected at both the partially reflective surface and the reflective surface will display speckle-patterns, and they will at least partially interfere with each other when they at least partially overlap when being registered. Thus, an interference pattern is registered which strongly varies even with small variations in the positions of the microscope objective and/or the sample with regard to the test beam of light. Thus, registering the light and evaluating it for any variations of the registered intensity-patterns allows for sensitively monitoring these positions.

If the partially reflective surface connected to the sample and/or the reflective surface of the microscope objective is spatially structured, this may increase the variations in the intensity-patterns registered for a test beam of coherent light with any variations of the positions of the microscope objective and the sample.

Particularly, the partially reflective surface connected to the sample can be a surface of a microscope slide and/or a cover slip. These surfaces are coming with the sample anyway. Thus, there is no need of providing a particular partially reflective surface for carrying out the method according to the present invention, although it may be provided if desired. It may not even be necessary to coat any surface of the microscope slide and/or the cover slip to be partially reflective. Instead, the angle at which the test beam of light is directed onto the respective surface may be selected such that the respective surface is partially reflected at this surface. I is to be noted that the test beam will not be directed orthogonally onto the partially reflective surface connected to the sample or onto the reflective surface of the microscope objective anyway, but at a typical angle between 20° to 70° or between 30° to 50° to the respective surface.

The light of the test beam may strongly differ in wave length from any and every light directed into the sample through the microscope objective. The method according to the present invention does not even require that the light of the test beam would be transmitted by the microscope objective. Particularly, the wave length of the light of the test beam may be selected such that it does not disturb any measurement executed using the microscope objective.

The light of the test beam reflected at the partially reflected surface connected to the sample and at the reflective surface of the microscope objective may be filtered with intensity or wave length filters prior to being registered. In this way, the light of the test beam may be separated from any other light. Thus, the method according to the present invention will not be disturbed by any measurement executed by means of the microscope objective or by ambient light.

In one embodiment of the method according to the present invention, a spatial light intensity distribution of the light of the test beam reflected at the partially reflected surface connected to the sample and at the reflective surface of the microscope objective is registered and compared to at least one reference light intensity distribution. This at least one reference light intensity distribution may be a previously registered light intensity distribution. If there is no difference between the present light intensity distribution and the reference light intensity distribution, there will also be no variation in the relative position of the microscope objective with regard to the sample.

If a difference between the present and the reference light intensity distribution is noticed, the present light intensity distribution may be compared to other reference light intensity distributions. Particularly, there may be a series of spatial light intensity distributions of the light of the test beam reflected at the partially reflective surface connected to the sample and at the reflective surface of the microscope objective previously registered for defined relative positions of the microscope objective with regard to the sample. Comparing the present light intensity distribution to this series of reference light intensity distributions and looking for the smallest difference allows to determine the present relative position of the microscope objective with regard to the sample with some accuracy. The differences between the actual or present light intensity distribution and any of the reference light intensity distributions may be simply calculated by subtracting the respective reference light intensity distribution from the actual light intensity distribution and summing up the differences in light intensity over all pixels or a selected image region involved.

In most practical embodiments of the method according to the present invention the relative position of the microscope objective with regard to the sample will not only be monitored but held fixed or constant. For this purpose, any variations of the light of the test beam reflected at the at least one partially reflective surface and at the reflective surface of the microscope objective may be compensated for by relocating the microscope objective with regard to the sample. In practice, accuracies in the single digit nm range are achieved. Generally, however, any variations of the light of the test beam reflected at the at least one partially reflective surface and at the reflective surface of the microscope objective may only be registered or compared to a threshold value or be compensated for in another way than by keeping constant the relative position of the microscope objective with regard to the sample.

A microscope according to the present invention comprises a microscope objective, a microscope slide configured to hold a sample, and an installation for carrying out the method according to the present invention. The installation includes a light source directing the test beam of light onto the at least one partially reflective surface connected to the microscope slide and onto a reflective surface of the microscope objective facing the sample, and a detector registering both the light of the test beam reflected at the at least one partially reflective surface and the light of the test beam reflected at the reflective surface of the microscope objective.

Both the light source and the detector are arranged at that side of the microscope slide facing away from the microscope objective, i.e. there, where less space constrictions apply than on the other side of the microscope slide.

The light source may be a laser, like, for example, a simple laser diode, providing the test beam as a laser beam, and the detector may be a spatially resolving detector. Particularly, the detector may include a digital camera. This camera may be a quite simple camera of any type, like CCD or CMOS. A camera having 100 by 100 pixels is sufficient for carrying out the method according to the present invention. Obviously, however, a higher number of pixels will not hurt.

Preferably, the detector of the microscope according to the present invention is operatively connected to a controller of a slide stage configured to position the microscope slide with regard to the microscope objective. This enables for automatically compensating for any variations of the light registered to keep the sample in a fixed position with regard to the microscope objective.

The detector and the light source may be fixed to the transmission illumination part of the microscope or to a base of the slide stage with regard to which the microscope slide is moved for being positioned with regard to the microscope objective. Alternatively, the light source and the detector may be fixed to the microscope slide or any holder holding the microscope slide.

Referring now in greater detail to the drawings, FIG. 1 depicts a microscope 1 including a microscope objective 2. The microscope objective 2 comprises a front lens 3 and a frame 4 holding the front lens 3 and having a metallic surface 5. In the operation of the microscope 1, a beam of excitation light 6 is focused into a sample 7 by means of the front lens 3. The focus of the beam of excitation light 6 is moved along a focal plane of the front lens 3 by means of a scanning device of the microscope 1, which is not depicted here. The focal plane of the microscope objective 2 only remains fixed with regard to the sample 7, if relative positions of the sample 7 and of a microscope slide 8 and a cover slip 9 between which the sample 7 is fixed remain fixed with regard to the microscope objective 2.

For monitoring the relative position of the microscope slide 8 and the cover slip 9 with regard to the microscope objective 2, a test beam 10 of light from a light source 11, like, for example, a laser diode 12, is directed onto partially reflective surfaces of the microscope slide 8 and the cover slip 9, and through these partially reflective surfaces onto the reflective metallic surface 5 of the frame 4 holding the front lens 3 of the microscope objective 2. The test beam directed onto all surfaces of an essentially equal angle of about 45° here. Light 16 reflected by the partially reflective surfaces 13 to 15, and light 17 reflected by the reflective surface 5 is registered by means of a spatially resolving detector 18, particularly a camera 19. The camera may include a wavelength filter whose transmission bandpass is adapted to a wavelength of the light of the test beam 10 so that the camera does not register light of other wavelength not coming from the light source 11.

Figure 2:
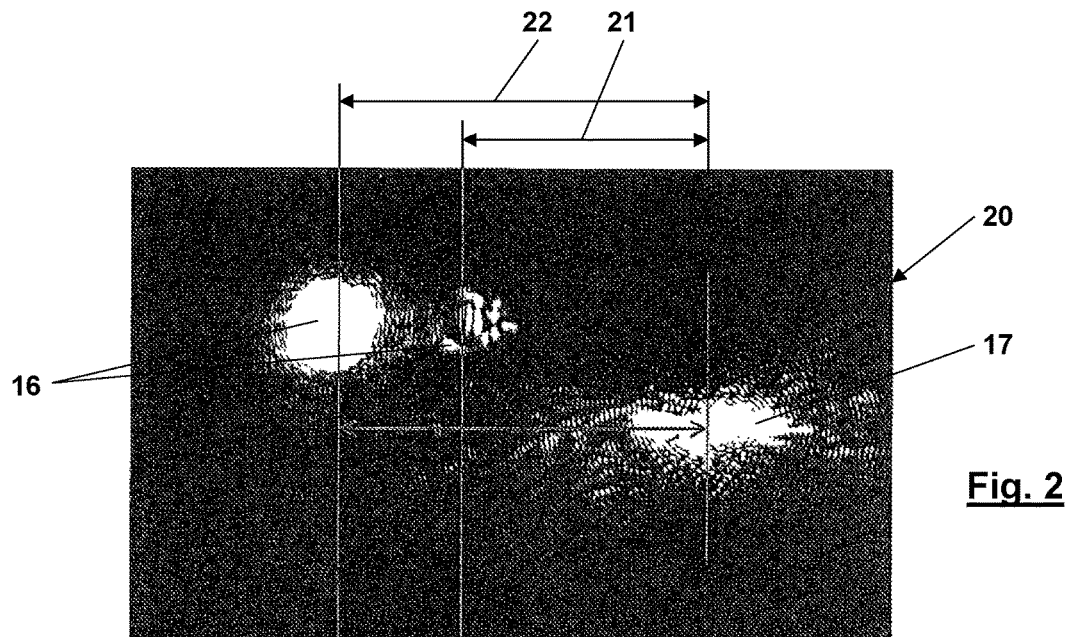
FIG. 2 depicts a light intensity distribution of reflected light of a test beam registered with a camera of the microscope according to FIG. 1 in a first relative position of a microscope objective of the microscope with regard to a sample.

FIG. 2 shows a light intensity distribution 20 including both the light 16 reflected by the partially reflective surfaces 13 to 15 and the light 17 reflected by the reflective surface 5. Both the light 16 and the light 17 show a speckle-pattern due to the fact that the test beam 10 is a beam of coherent laser light. With any variation of the relative position of the microscope objective 2, of the microscope slide 8 or of the cover slip 9 with regard to the test beam 10 the light intensity distribution 20 varies. This particularly applies to any variation of the relative position of the microscope objective 2 with regard to the sample, i.e. with regard to the microscope slide 8 and the cover slip 9.

Figure 3:
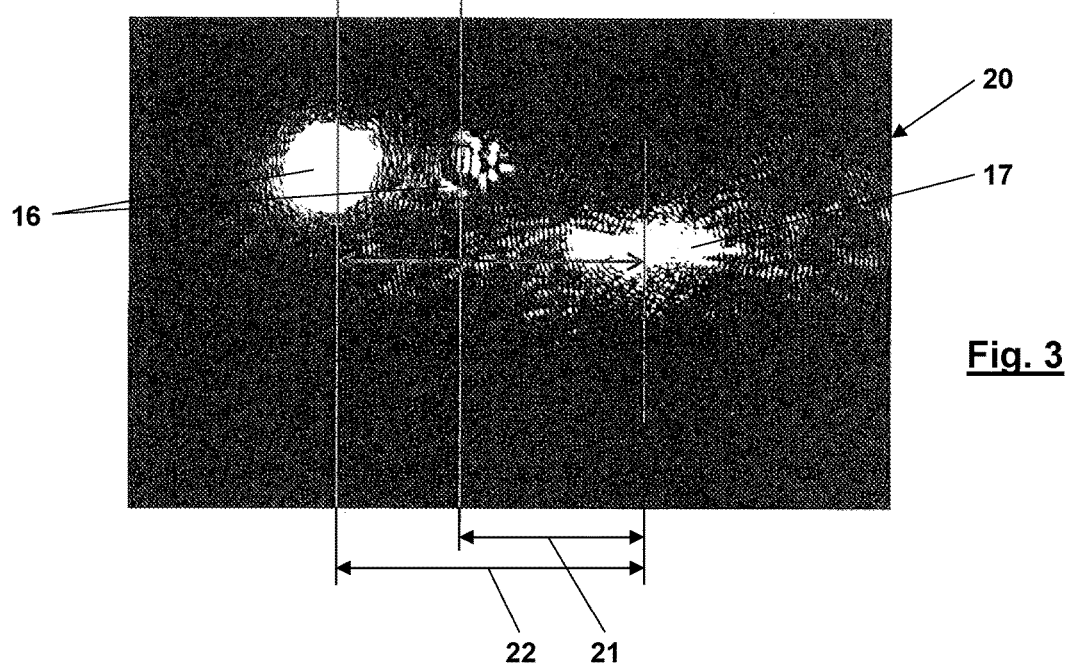
FIG. 3 is a light intensity distribution of reflected light of a test beam similar to FIG. 2 registered for another relative position of the microscope objective with regard to the sample.

FIG. 3 shows the light intensity distribution 20 for another focal distance between the microscope objective 2, on the one hand, and the microscope slide 8 and the cover slip 9 on the other hand. Here, distances 21 and 22 between the centers of the light 17 and of the main components of the light 16 are smaller than in FIG. 2. By comparing the actual light intensity distribution 20 with a series of reference light intensity distributions registered for known focal distances between the microscope objective 2 and the sample 7, the actual focal distance can be determined at a high accuracy by extrapolation. Further, by directly compensating for any variations of the light intensity distribution 20 by varying the focal distance between the microscope objective 2 and the sample 7 the relative position of the sample 7 with regard to the microscope objective 2 may be held fixed.

FIG. 2 and FIG. 3 exemplify an obvious and simple embodiment example of the present invention, wherein the light 16 coming from sample 7 or reflected by the microscope slide 8 and the coverslip 8, and the light 17 coming from the microscope objective 2 essentially do not overlap in the light intensity distribution 20 registered by the detector 18 and are shifted with respect to each other in response to a focus change. It is to be noted, however, that separately registering the light 16 and the light 17 is not mandatory. Instead, the invention also works, if the light 16 and the light 17 partially or fully overlap. In fact, the distribution 20 including both the light 16 reflected by the partially reflective surfaces 13 to 15 and the light 17 reflected by the reflective surface 5 shows particular strong variations even with small changes of the relative position of the sample 7 with respect to the microscope objective 2, if the test beam consists of coherent light so that the light 16 and the light 17 at least partially interfere at the detector, i. e. if the light intensity distribution 20 registered is an interference pattern.

Figure 4:
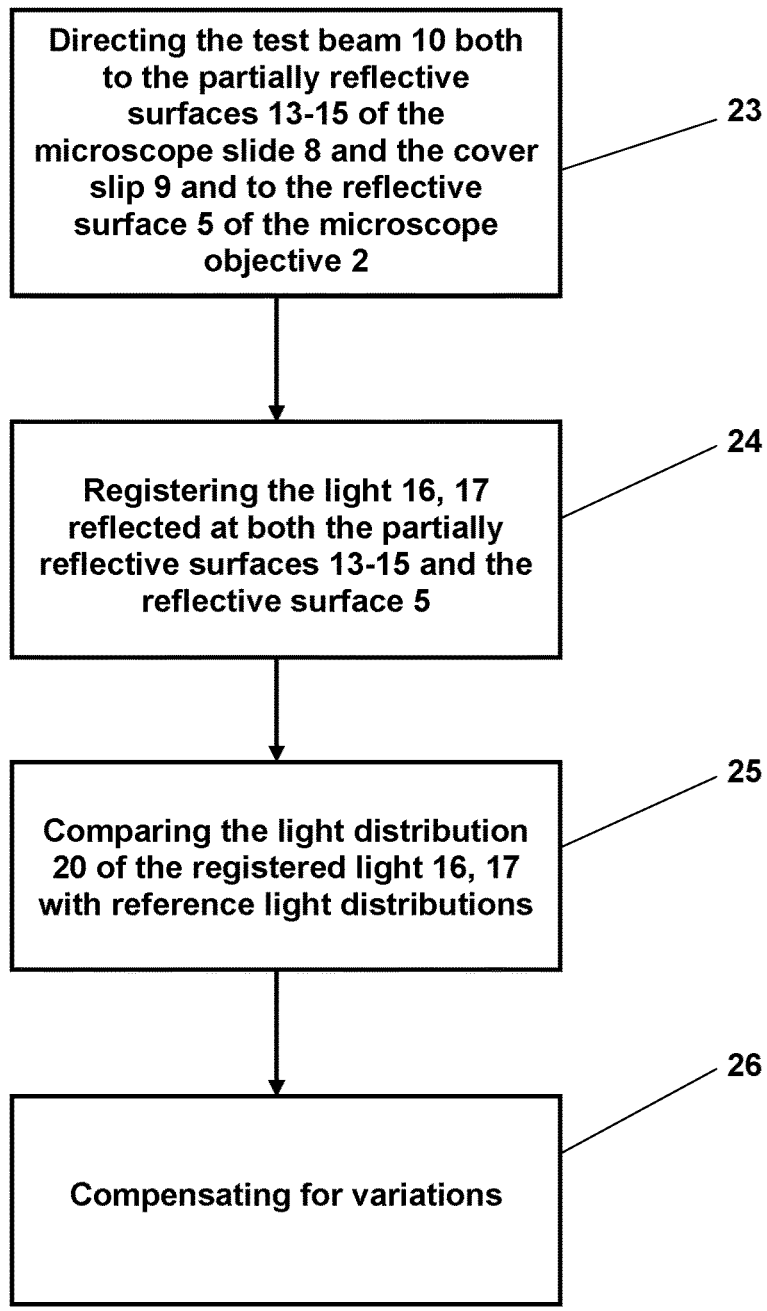
FIG. 4 is a flowchart of one embodiment of the method according to the present invention.

The flow diagram according to FIG. 4 starts with directing 23 the test beam 10 to both the partially reflective surfaces 13 to 15 of the microscope slide 8 and the cover slip 9 and the reflective surface 5 of the microscope objective 2. The step registering 24 the light 16, 17 reflected at both the surfaces 13 to 15 and the surface 5 is carried out simultaneously with the step of directing 23. Comparing 25 the light intensity distributions 20 of the registered light with reference light intensity distributions should also be carried out as quickly as possible. This enables compensating 26 for any variations so that the sample 7 is held fixed with regard to the microscope objective 2r.

Many variations and modifications may be made to the preferred embodiments of the invention without departing substantially from the spirit and principles of the invention. All such modifications and variations are intended to be included herein within the scope of the present invention, as defined by the following claims.

I claim:

1. A method of monitoring a relative position of a microscope objective with regard to a sample, the method comprising
    directing a test beam of light onto at least one at least one partially reflective surface connected to the sample,
    registering and evaluating first reflected light of the test beam that is reflected at the at least one at least one partially reflective surface,
    also directing the test beam onto a reflective surface of the microscope objective facing the sample, and
    registering and evaluating second reflected light of the test beam that is reflected at the reflective surface of the microscope objective,
    wherein the test beam is directed from a side of the sample facing away from the microscope objective through the at least one partially reflective surface connected to the sample onto the reflective surface of the microscope objective, and
    wherein the first reflected light and the second reflected light are both registered at that side of the sample facing away from the microscope objective.

2. The method of claim 1, wherein the first reflected light and the second reflected light are both registered with a camera located at that side of the sample facing away from the microscope objective.

3. The method of claim 1, wherein the test beam is a beam of coherent light, wherein the first reflected light and the second reflected light at least partially overlap with each other when being registered.

4. The method of claim 1, wherein at least one of
    the at least one at least partially reflective surface connected to the sample and
    the reflective surface of the microscope objective is spatially structured.

5. The method of claim 1, wherein the at least one at least partially reflective surface connected to the sample is selected from a surface of a microscope slide and a surface of a cover slip.

6. The method of claim 1, wherein the reflective surface of the microscope objective is a surface of a metal frame holding a front lens of the microscope objective.

7. The method of claim 1, wherein the light of the test beam differs in wave length from every light directed through the microscope objective into the sample.

8. The method of claim 7, wherein the first reflected light and the second reflected light are filtered with a wavelength filter prior to being registered.

9. The method of claim 1, wherein a light intensity distribution of the first reflected light and the second reflected light is registered and compared to at least one reference light intensity distribution.

10. The method of claim 9, wherein the at least one reference light intensity distribution is a previously registered light intensity distribution of the first reflected light and the second reflected light.

11. The method of claim 10, wherein the at least one reference light intensity distribution is one of a series of light intensity distributions of the first reflected light and the second reflected light previously registered under defined relative positions of the microscope objective with regard to the sample.

12. The method of claim 1, wherein variations of the first reflected light and the second reflected light are compensated for by relocating the microscope objective with regard to the sample.

13. A microscope comprising
a microscope objective,
a microscope slide configured to hold a sample, and
an installation for monitoring a relative position of the microscope objective with regard to the sample, the installation comprising
a light source configured to direct a test beam of light onto at least one at least one partially reflective surface connected to the microscope slide, and
a detector configured to register first reflected light of the test beam that is reflected at the at least one surface,
wherein the light source is configured to also direct the test beam onto a reflective surface of the microscope objective facing the sample,
wherein the detector is configured to also register second reflected light of the test beam reflected at the reflective surface of the microscope objective,
wherein the light source and the detector are both arranged at a side of the microscope slide facing away from the microscope objective, and
wherein the light source is configured to direct the test beam through the at least one partially reflective surface connected to the microscope slide onto the reflective surface of the microscope objective.

14. The microscope of claim 13, wherein the light source includes a laser diode providing the test beam as a laser beam.

15. The microscope of claim 13, wherein the detector includes a camera comprising at least 100 by 100 pixels.

16. The microscope of claim 13, wherein the detector is operatively connected to a controller of a slide stage configured to position the microscope slide with regard to the microscope objective.

* * * * *